United States Patent [19]

Hitchcock

[11] 3,864,897
[45] Feb. 11, 1975

[54] LOADING APPARATUS
[75] Inventor: William F. Hitchcock, West Newbury, Mass.
[73] Assignee: The Gillette Company, Boston, Mass.
[22] Filed: June 29, 1973
[21] Appl. No.: 374,900

[52] U.S. Cl............ 53/159, 53/166, 53/242, 53/247, 53/258, 29/211 R, 29/211 C
[51] Int. Cl............................................ B65b 35/40
[58] Field of Search............ 53/159, 164, 166, 242, 53/243, 249, 250, 251, 252, 258, 386, 148, 149; 29/211 R, 211 C

[56] References Cited
UNITED STATES PATENTS

| 1,591,949 | 7/1926 | Anderson | 53/159 |
|---|---|---|---|
| 2,324,930 | 7/1943 | Joa | 53/164 |
| 2,955,393 | 10/1960 | Müller et al. | 53/242 X |
| 3,513,623 | 5/1970 | Pearson | 53/159 X |
| 3,562,775 | 5/1968 | Mullins | 53/243 X |
| 3,608,269 | 9/1971 | Gore | 53/159 X |
| 3,655,180 | 4/1972 | Holler | 53/159 X |
| 3,724,185 | 4/1973 | Berney | 53/249 X |
| 3,783,493 | 1/1974 | Dawidowicz et al. | 29/211 R X |

Primary Examiner—Travis S. McGehee
Assistant Examiner—Horace M. Culver

[57] ABSTRACT

Apparatus for assembling and inserting two coordinated groups of articles into corresponding compartments of a multicompartment container includes an assembly conveyor which receives articles sequentially and assembles those articles in spaced, aligned relation in a group; transfer mechanism which includes two spaced transfer members for transferring two successive groups of spaced, aligned articles from the assembly conveyor to a loading station; and an insertion mechanism at the loading station that includes vertically reciprocable pins for camming the two groups of articles into corresponding individual compartments of a container simultaneously.

20 Claims, 12 Drawing Figures

LOADING APPARATUS

SUMMARY OF THE INVENTION

This invention relates to assembly apparatus and more particularly to apparatus for assembling and frictionally securing a coordinated group of articles such as razor blade units into corresponding compartments of a multi-compartment container.

There has recently been developed an improved shaving system that employs a razor blade unit of the type that has a relatively rigid body portion that includes a guard structure and at least one blade element permanently secured to the body portion to provide a fixed geometric relation between the guard structure on the cutting edge of the blade element. Formed integrally with the body portion is coupling structure that engages a cooperating structure of a razor handle. A multi-compartment container is employed for storing a plurality of these blade units and permitting each such stored blade unit to be independently secured to the razor handle for use as required. These blade units must be handled with care throughout assembly and insertion of the blade units into the compartments of the container to avoid damage to the delicate cutting edges of the blade elements.

It is an object of this invention to provide novel and improved apparatus for assembling and inserting articles into a multi-compartment container.

A more specific object of the invention is to provide novel and improved apparatus for assembling a group of razor blade units; for transferring assembled groups of blade units; and for inserting such groups of blade units into corresponding compartments of a dispensing container.

In accordance with a feature of the invention there is provided apparatus for frictionally securing a plurality of articles such as razor blade units in corresponding compartments of a multi-compartment container comprising first input means for serially feeding razor blade units, an assembly conveyor for receiving articles sequentially from the first input means and assembling the blade units in spaced, aligned relation in a group, a loading station having a platform and a blade unit insertion mechanism, transfer mechanism for transferring the assembled group of spaced, aligned blade units from the assembly conveyor to the loading station, second input means for transferring a container to the loading station, and means for operating the insertion mechanism to frictionally secure the group of blade units at the loading station into compartments of the container.

In accordance with another feature of the invention there is provided a mechanism for sequentially transferring two groups of aligned blade units to the loading station in proper position for insertion into container compartments, one group being moved in two steps of different length to compensate for container flange structure and the other group being moved in a single step concurrently with the second step movement of the first group. The transfer mechanism includes two transfer members spaced apart a distance sufficient to receive a blade unit therebetween and one transfer member is movable relative to the other transfer member as a function of the travel of the transfer mechanism.

In accordance with still another feature of the invention, an insertion mechanism is provided with cams blade units into compartments without imposing a translational force on the container. The insertion mechanism includes a plurality of insertion pins that are mounted for vertical reciprocating movement. After the blade units (each in tilted position) are placed in an aligned, spaced group at the loading station, a container, the compartments of which have open tops, is placed in inverted position over the group of blade units so that each blade unit is partially within its compartment. The insertion pins are then raised simultaneously camming the blade units into their compartments with a rotary motion where they are latched securely. During the camming action, each blade unit is free to slide laterally relative to the insertion pin that is driving it and hence no lateral force is imposed on the container.

In a particular embodiment, each razor blade unit includes a body portion and a blade portion permanently secured to the body portion, and each container compartment includes a resilient latch structure. The container supply channel includes a first transfer device for transferring one container at a time from a stack, intermediate support mechanism for receiving a container from the first transfer device that includes a pair of pivotally mounted jaws and jaw control means, and a vacuum head operative to engage the base of a container for transferring a container from the jaws to the loading station and to hold the container in engagement with the loading station while a group of blade units are inserted into compartments of the container. The assembly conveyor is stepped continuously in one direction and as soon as a group of five blade units have been assembled, the transfer mechanism in a first step transfers that group to the loading station. A second group of four blade units is similarly assembled and transferred by a second step of the transfer mechanism. The insertion mechanism includes a matrix of individual reciprocable insertion pins, each operative to cam a blade unit past a container latch structure into frictionally secured relation in a container compartment. Removal mechanism responsive to and movable with the first container transfer device transfers a loaded container from the loading platform. The control means includes coordinated drive mechanism for feeding blade units serially along said first input means and operating the assembly conveyor at a first rate, for operating the transfer mechanism in two steps to transfer two groups of blade units from the assembly conveyor to the loading station and to transfer a container to the loading station, and then raising the insertion pins to cam the blade units into their compartments.

The invention provides efficient production apparatus for assembling and loading blade units into multi-compartment containers quickly and without damage to the blade units or to the containers. Other objects, features and advantages of the invention will be seen as the following description of a particular embodiment progresses, in conjunction with the drawings, in which:

DESCRIPTION OF PARTICULAR EMBODIMENT

Figure 1:
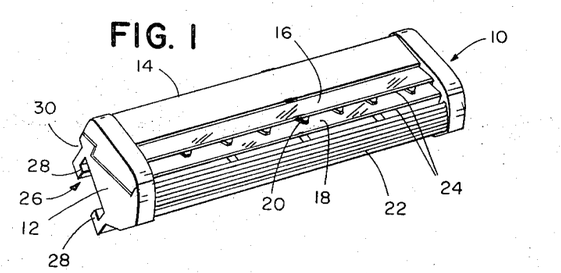
FIG. 1 is a perspective view of a blade unit article of the type to be secured in the container.

A perspective view of a blade unit article 10 of the type that is processed with apparatus of the invention is shown in FIG. 1. That blade unit includes a body formed of a base member 12 and a cap member 14. Two blade elements 16, 18 with interposed spacer 20 secured between the base and the cap members. A guard surface 22 integral with the base 12 extends parallel to the exposed edges 24 of blade elements 16 and 18. Formed in the base 12 is coupling structure 26 that includes flanges 28 for attachment to cooperation with cooperating runner structure of a razor handle. At the rear of the base adjacent the coupling structure is an offset surface 30.

Figure 2:
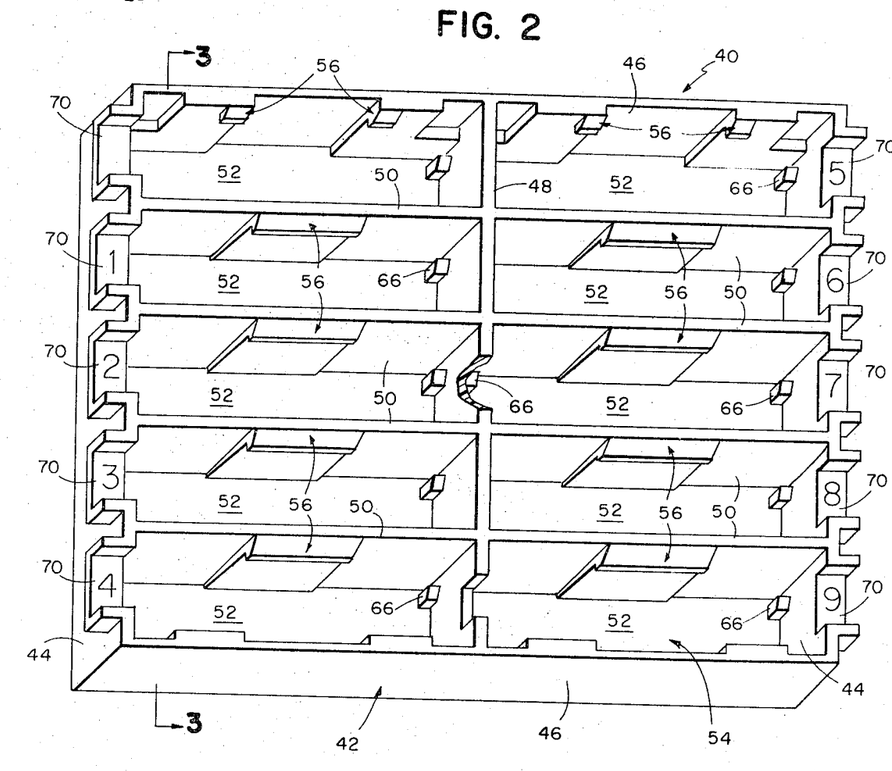
FIG. 2 is a perspective view of the configuration of a container of the type in which razor blade articles are to be secured.
Figure 3:
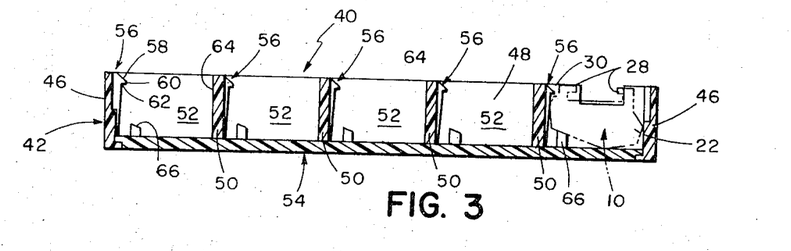
FIG. 3 is a sectional view of the container taken along the line 3—3 of FIG. 2.

Blade units of this type are secured in containers 40 of the type shown in FIGS. 2 and 3. Container 40 is of molded plastic and includes a member 42 that defines side walls 44, end walls 46, a central separator wall 48 that extends between end walls 46 parallel to side walls 44, and eight divider walls 50 that extend between side walls 44 parallel to end walls 46 so that structure defines 10 compartments 52, each of which is adapted to receive a blade unit of the type as shown in FIG. 1. A base member 54, which in this embodiment is formed of a separated piece of the plastic material but may be integral with the member 42 forms a bottom wall for the compartments 52. Formed on the wall on the upper side of each compartment (as viewed in FIG. 2) is a latch structure 56 that projects inwardly from the vertical surface and includes an inclined camming surface 58, a vertical surface 60 and a horizontal latching surface 62. Surface 60 is disposed at about 0.05 inch from the plane of the supporting wall. The opposite surface 64 of the compartment 52 is planar, and at either end of the chamber is formed a support projection 66 for engaging the top end surface of cap 14 of the blade unit. Projecting outwardly from each side wall 44 are a series of guide recesses 70, the widths of which are about twice the width of walls 44 and 48. As indicated in the dashed view in FIG. 3, blade unit 10 inserted in a compartment in inverted position with the forward end surfaces of the cap 14 resting on the base 54, rear surfaces of the cap resting on support projections 66, offset surface 30 engaged by latch surface 62, and guard structure 22 in engagement with wall surface 64.

Figure 4:
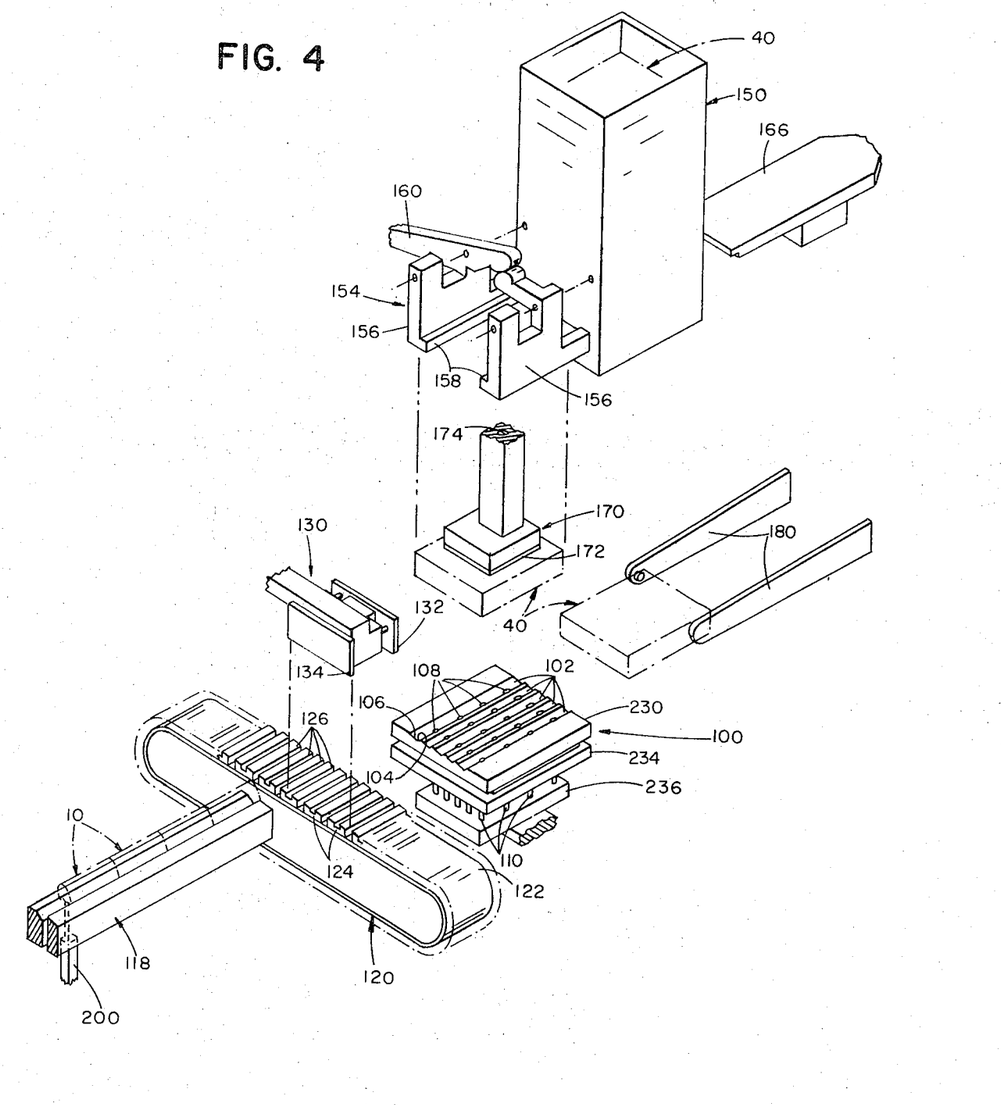
FIG. 4 is an exploded perspective view of apparatus constructed in accordance with the invention for automatically assembling a group of blade units and loading that assembled group into corresponding compartments of the container.
Figure 8:
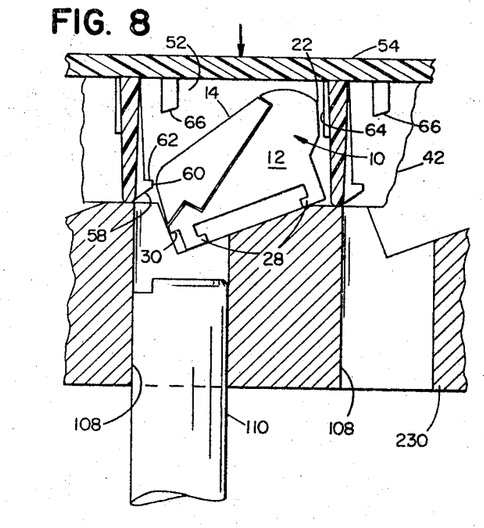
FIGS. 8 and 9 are enlarged views showing steps in the insertion of a blade unit into a container compartment.
Figure 9:
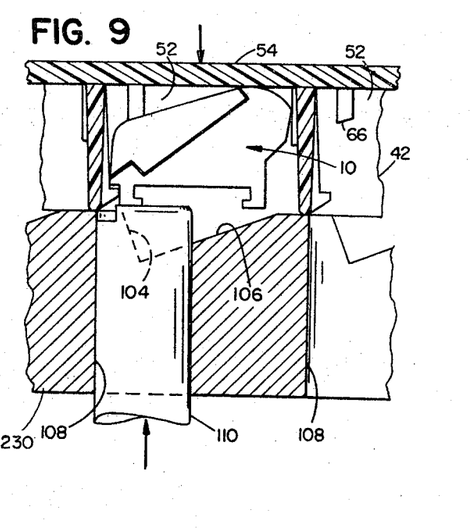

An exploded perspective view of apparatus for assembling and securing a group of blade units into container compartments is shown in FIG. 4. The apparatus includes a loading station 100 having a series of five transversely extending grooves or troughs 102 each of which has an inclined side wall 104 and an inclined bottom wall 106 disposed perpendicular to side wall 104. Formed in each trough is a series of four vertical passages 108, in each of which is disposed an insertion pin 110 (FIGS. 8 and 9).

Blade units 10 are fed along input guide 118 in end to end relation. Positioned between input guide 118 and the loading station 100 is an assembly mechanism 120 in the form of conveyor 122 composed of a series of flights 124, each of which include two T-shaped heads 126 onto each of which a blade unit is slid from the input guide 118 for attachment to the assembly mechanism 120. Cooperating with the assembly mechanism is a transfer head 130 that includes spaced transfer bars 132, 134, bar 132 being resilient mounted for movement toward bar 134.

In operation, assembly conveyor 122 is indexed at the same rate as blade units are fed along input guide unit 118 so that a series of up to five blade units 10 are secured to consecutive flights of the conveyor 122. The transfer head 130 is then indexed laterally to slide the group of blade units from the assembly conveyor 122 onto corresponding grooves 102 at the loading station 100. Further blade units continue to be loaded onto the assembly conveyor, and after a predetermined number of blade units 10 have been loaded (four in this embodiment), the transfer unit 130 is indexed a further distance so that transfer bar 132 pushes the first group of blade units onto the further section of the loading platform 100 while transfer bar 134 is sliding the second group of blade units from the assembly conveyor 122 onto the near section of the loading platform 100 in alignment with the first group. After this transfer is completed the transfer head 130 is raised and returned to its starting position for the next transfer cycle.

The containers 40 are held in stacked relation in guide structure 150, the bottom container being transferred in a slicing operation from support structure 150 to an immediate support structure 154 which has two jaw structures 156 each of which has a support flange 158 as the base onto which the container transferred from stack 150 is loaded. The container is transferred by a slice or pusher bar 166 which is aligned with the lowermost box in the stack 150 and it reciprocates to transfer the container to the support jaws 156 and after its return allows the next container in the stack 150 to drop into the lowermost position. Cooperating with support jaws structure 154 is a transfer head 170 that is mounted for vertical reciprocation and includes a resilient lower surface 172 in which are disposed a plurality of ports that are connected to a vacuum line 174. After the box has been transferred onto flanges 158, vacuum head 170 has moved down from its initial position above the jaw flanges 158 to engage the base 54 of the container and vacuum is applied to secure the container to the transfer head 170. The jaws 156 are then opened by operation of linkage 160 which forces the flanges 158 of the jaws 156 apart and allows the container to be carried by the transfer head 170 down onto the loading station platform 100. In that position the container is located so that the blade units 10 in grooves 102 in the loading platform enter into corresponding compartments 52 in the container. While the container is held against the platform 100, the pins 110 are raised, camming the nine blade units into the corresponding compartments and forcing offset surfaces 30 past flanges 56 so that the blade units are secured in the compartments.

Gripper jaws 180 are mounted for reciprocating motion with pusher 166. These jaws are positioned in alignment with the container 40 when it is supported on the loading platform 100 and are forced together in the operating sequence to grip a loaded container. After the container has been gripped, the pusher 166 and gripper jaws 180 retract and the loaded container 40 is removed from the loading platform 100 for the transfer to a further processing station.

Figure 5:
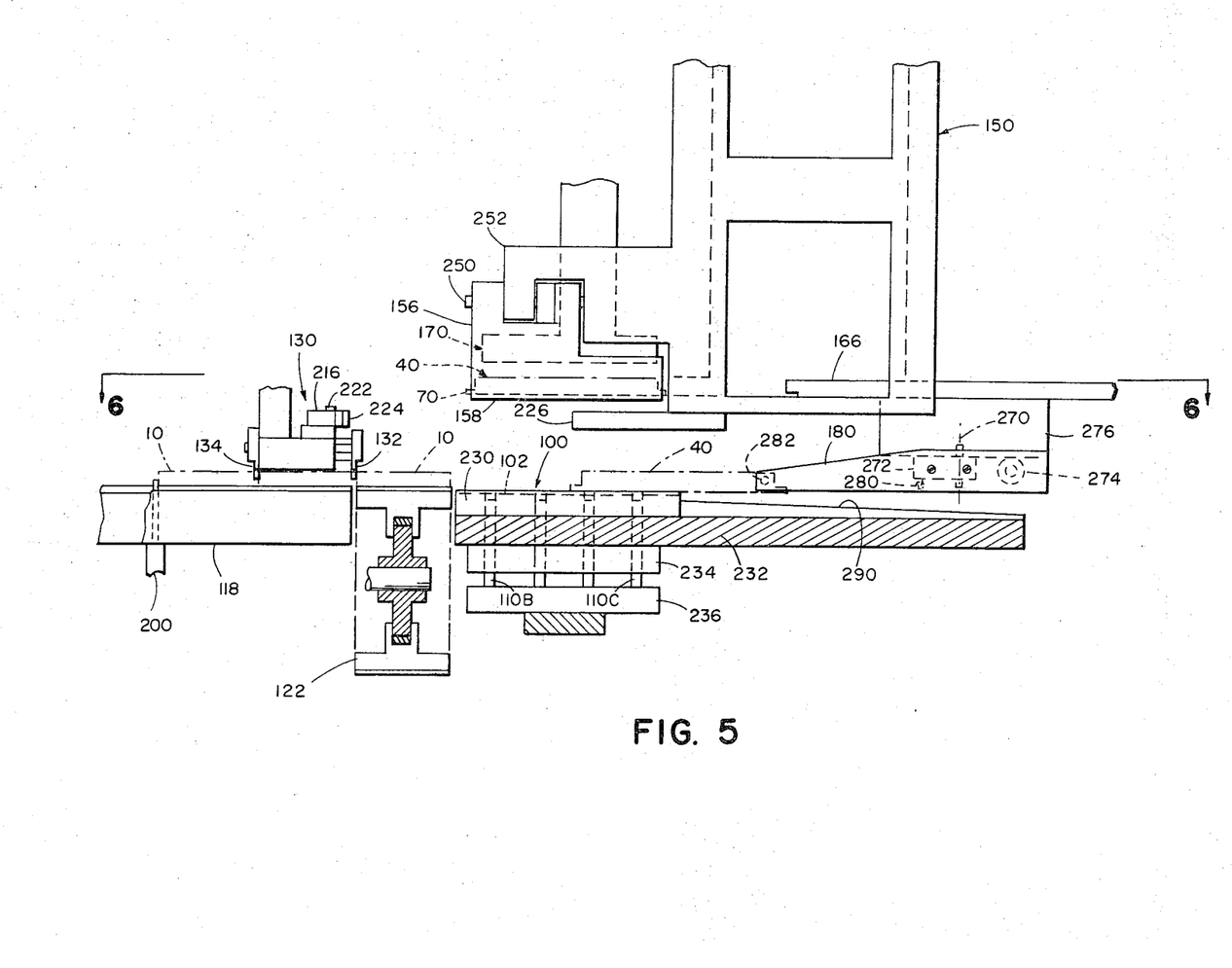
FIG. 5 is a side view of apparatus shown in FIG. 4.
Figure 6:
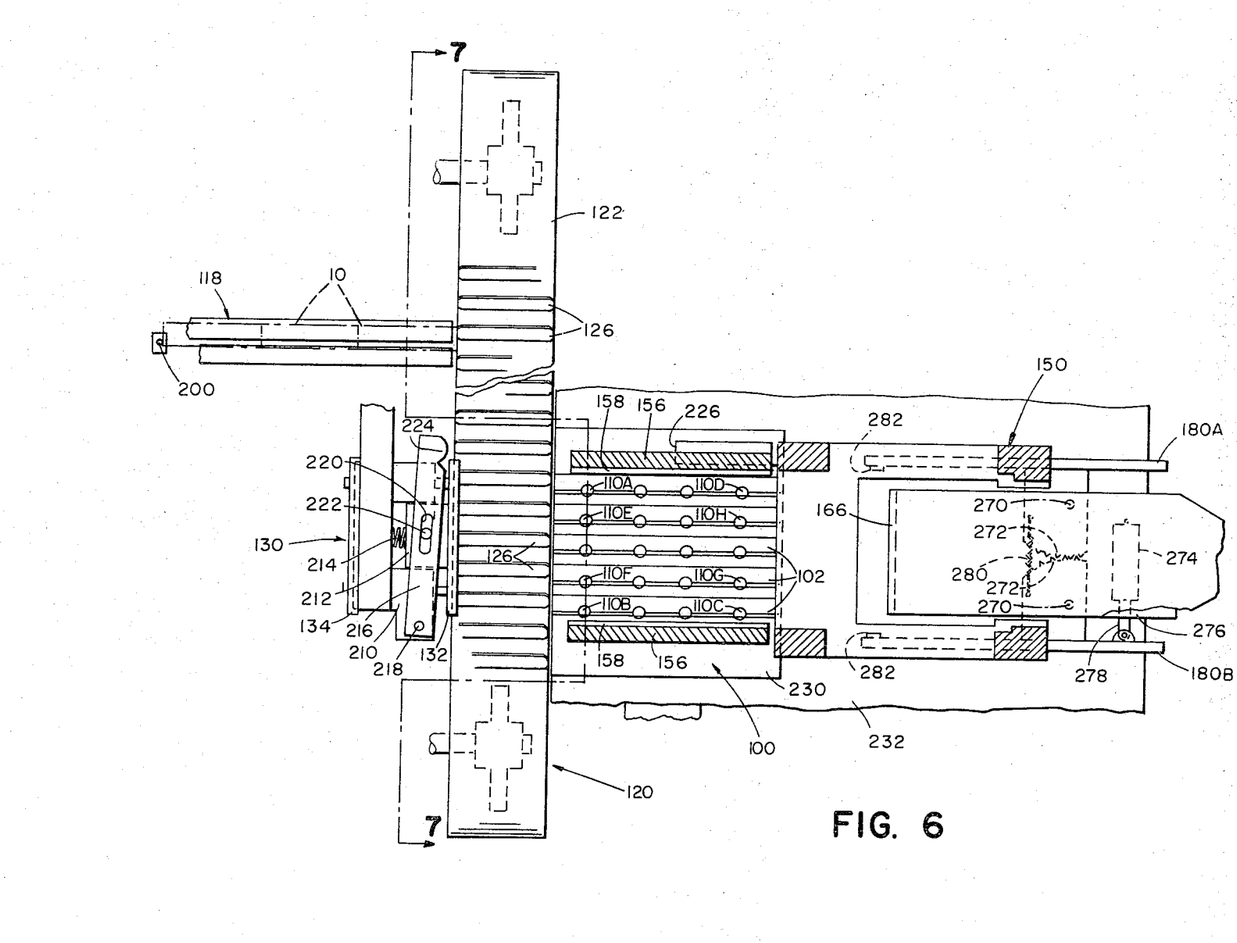
FIG. 6 is a sectional view taken along the line 6—6 of FIG. 5.
Figure 7:
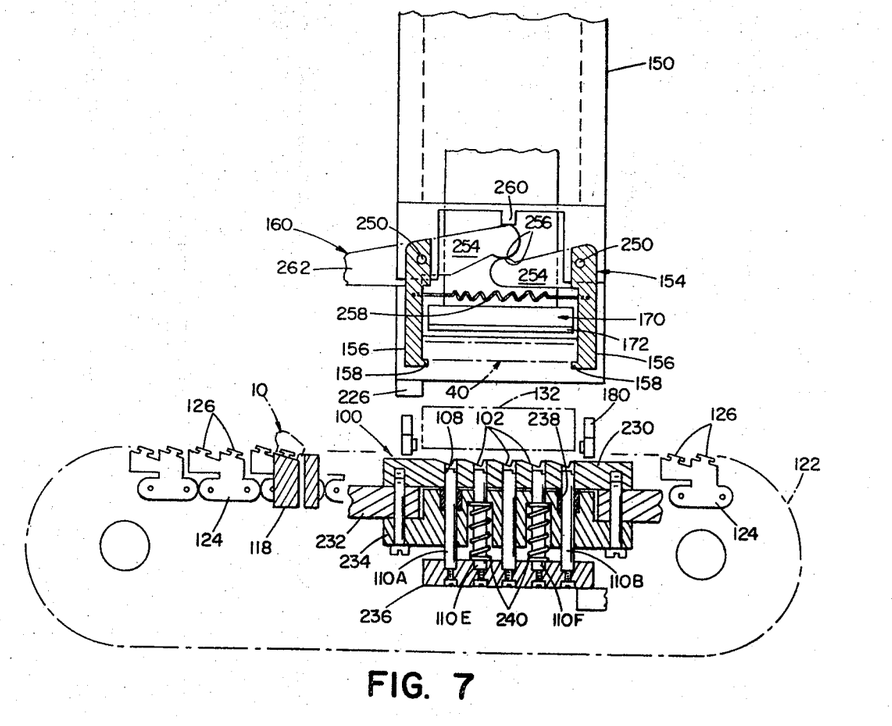
FIG. 7 is a sectional view taken along line 7—7 of FIG. 5.

Further details of the apparatus may be seen with reference to FIGS. 5–7. The input channel 118 has a series of blade units disposed in it that are fed by a drive mechanism which includes a drive element 200 that is driven in reciprocating movement and advances a series of blade units 10 along the input channel 118 and feeds the blade units one at a time onto flights 124 of the conveyor 122. As indicated in FIG. 7, each conveyor flight element has a pair of coupling elements 126, each of which receives the flanges 28 of the blade unit for positively securing the blade unit to the assembly conveyor 122. The transfer head 130, and particularly bars 132 and 134, slide groups of blade units from those coupling elements on the grooves 102 in the loading platform.

As may be best seen in FIGS. 5 and 6, transfer bar 134 is fixed in position on the body 210 of the transfer head 130 while transfer bar 132 is movable relative to bar 134, being connected by a lost motion linkage to body 210. Transfer bar assembly 132 includes a projection 212 which receives spring 214. Lever 216 is pivotably secured at 218 to body 210 and has elongated slit 220 in which pin 222 of transfer bar assembly 132 is received. The end 224 of lever 216 remote from pivot 218 engages stop 226 to limit the forward motion of bar 132. As transfer head 130 continues to advance, bar 134 moves toward bar 132. This mechanism provides compensation for the difference in effective thickness of wall 48 and wall 44 and lips 70 of the container 40 so that the two groups of blade units are properly positioned by transfer head 130 on loading platform 100.

The transfer head 130 transfers a first group of five blade units from the assembly conveyor 120 to the loading station 100, sliding those blade units onto corresponding grooves 102, and then similarly transfers a second group of four blade units, the first group being advanced as the second group is transferred. The blade units remain in same angular position in which they were disposed on the input channel 118 and an assembly conveyor 122, that angle permitting maximum clearance in the positioning of the container 40 relative to the blade units 10 on the loading station 100.

Further details of the loading station may be seen with reference to FIG. 7. Station includes platform plate 230 in which the grooves 102 are formed; support plate 232 and a guide plate 234 in which the actuating pins 110 pass. The pins connected to an actuator plate 236 for upward movement as a unit. The four corner pins (110 ABCD — FIG. 6) are mounted in bushings 238 while four adjacent pins (110 EFGH — FIG. 6) carry springs 240 which act to bias the pins and actuator plate 236 towards their lower position.

Further details of the intermediate support structure 154 may be seen with reference to FIGS. 5–7. Each arm 156 is supported on a pivot shaft 250 on projections 252 and includes an inwardly extending lever portion 254 having an engaged cam surface 256 at its inner end. Spring 258 biases the arms for rotation of support flanges inwardly against stop 260. Rotation of actuating arm 262 causes the two engaged levers 254 to rotate outwardly and release the container 40 that is supported on flanges 158.

Transfer head 170 is mounted for vertical reciprocating movement between an upper position as shown in FIGS. 5 and 7 slightly spaced from the upper surface of a container 40 on support flanges 158 and a lower position where the container is held in contact with the loading platform 100.

The gripper jaws 180 are mounted for pivoting movement about axis 270 (FIG. 6) and include engaged gear portions 272. Actuator cylinder 274 is secured at one end to the support structure 276 and its piston rod 278 is pivotally attached to jaw 180B. Spring 280 biases the jaws 180 so that their clamp ends 282 are urged away from one another.

Figures 10A, 10B:
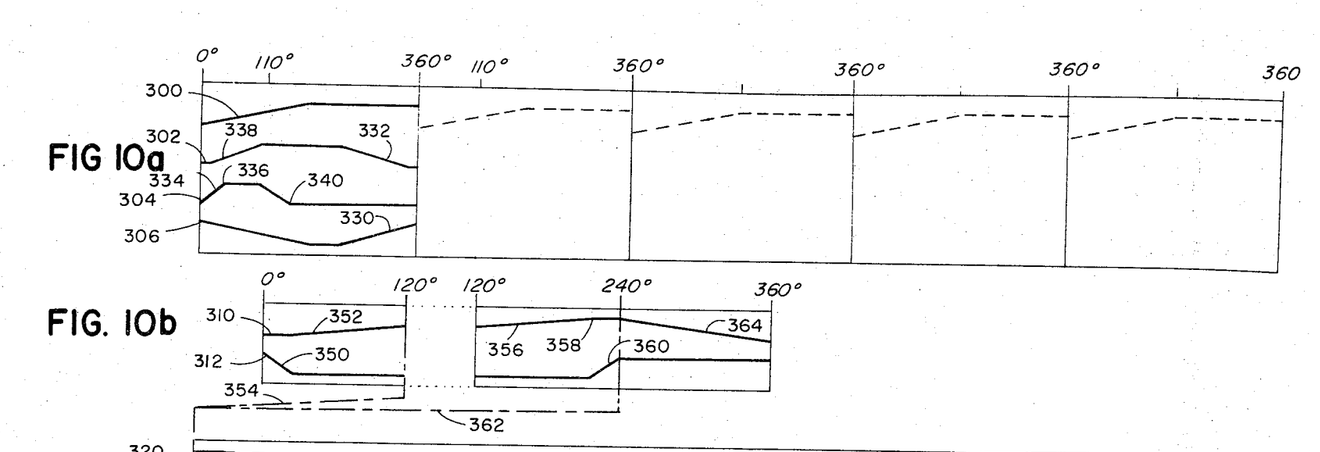
FIGS. 10a through 10c are timing diagrams indicating a sequence of operation of the apparatus shown in FIGS. 4–7.
Figure 10C:
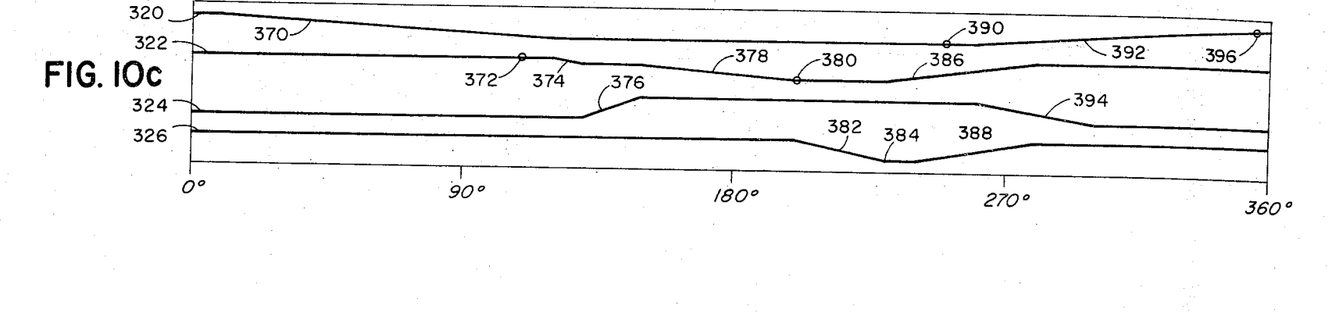

Further understanding of operation of the apparatus may be had with reference to the cam and timing diagram shown in FIG. 10. FIG. 10a indicates the motion of the input cam shaft which coordinates the feeding of blade units 10 from the input channel 118 onto the assembly conveyor 122; FIG. 10b indicates the motion of the transfer cam shaft which operates the transfer head 130; and FIG. 10c indicates the motion of the loading cam shaft which operates elements at the loading platform 100 and controls transfer of containers 40 to and from platform 100.

With reference to FIG. 10a, line 300 indicates blade unit movement from the input channel 118 to assembly conveyor 122; line 302 indicates motion of the conveyor indexing cam; line 304 indicates motion of the shot pin cam in the indexing conveyor; line 306 indicates motion of the pusher cam that controls the lateral motion of pin 200. In FIG. 10b, line 310 indicates the motion of the cam that controls the horizontal motion of the transfer head 130 and line 312 indicates the motion of the cam that controls the vertical motion of the transfer head 130. These cams are driven at one-half the rate of the cams of FIG. 10a. In FIG. 10c, line 320 indicates the motion of the cam that reciprocates the pusher 160 and gripper jaws 180; line 322 indicates the motion of the cam that controls motion of the vacuum head 170; line 324 indicates motion of the cam that controls the jaw assembly 154; and line 326 indicates motion of the cam that raises insertion pins 110. The cams indicated in FIG. 10c are driven at a rate of one revolution for every five revolutions of the cams indicated in FIG. 10a.

With reference to FIG. 10a, those cams control the advance of a blade unit from the input channel 118 onto the assembly conveyor 122 and the indexing of that conveyor one step. Cams 302 and 304 operate in sequence to advance a blade unit 10 once each cam cycle. However, a defective blade unit 10 may be detected in the input channel 118 and discarded and under such circumstances no blade unit is fed onto the assembly conveyor 122. The discard mechanism on the input channel 118 is interlocked with a clutch that controls conveyor indexing cam 302 and upon identification of a defective blade unit, that clutch locks out the cam 302 for one cycle. Cam 306 moves pin 200 laterally in the input channel 118, advancing a blade unit 10 during portion 330, that is from 225° to 360° of shaft rotation. During this interval the drive mechanism for the assembly conveyor 122 is being reset by cam 302 (portion 332). At 0° the shot pin cam 304 starts to move (line 334) to release the ratchet drive of the assembly conveyor 122 and reaches a disengaged position at point 336. Conveyor cam 302 then indexes the conveyor forward as indicated by line 338. The shot pin is reengaged at point 340 and, if a defect signal has not been generated, the index cam 302 is reset as indicated by line 332.

Each time cam 302 is indexed through a fully cycle, a count is recorded and on reaching a count of 5, a solenoid is energized and the shaft on which cams 310 and 312 are mounted starts to rotate at the 110° position of the cam shaft indicated in FIG. 10a. Cam 312 controls the vertical motion of transfer head 130 and lowers the head as indicated by line 350. After 20° rotation of the cam shaft the head is fully lowered and starts to move forward as indicated by line 352 of cam 310. At 120° rotation of the cam shaft the first group of five blade units have been slid from the assembly conveyor elements 126 onto the input side of the loading station 100. Should the system be loading a container 40 with only five blade units, a signal is generated as indicated by line 354 to actuate the loading cam shaft indicated in FIG. 10c. In this particular embodiment, however, nine blade units are loaded into a container box and therefore at 120° a clutch is energized to stop the cam shaft until the imput cam shaft (FIG. 10a) and particularly cam 302 has been indexed four more times, indicating assembly of a group of four more blade units 10 on the assembly conveyor 122. In response to that count of four the clutch is de-energized to cause continued rotation of the transfer cam shaft (FIG. 10b) with the transfer head 130 being moved forward as indicated by line 356 to the 220° angular position (point 358). Cam 312 raises the transfer head (line 360) and when the head is raised (at 240° angular position), a signal indicated by line 362 energizes the loading cam shaft (FIG. 10c). The transfer cam shaft continues to rotate and returns head 130 to its starting position as indicated by line 364 where it stops and awaits the assembly of the next group of five blade units. It will be noted the the indexing of the assembly conveyor 122 occurs prior to and separate from movement of the transfer head 130 so that the indexing conveyor 122 is stopped while the transfer head 130 is moving forward in each of its two steps. On return motion, the transfer head 130 is raised so clears the blade unit 10 on the assembly conveyor 122.

After the nine blade units are positioned on the loading platform 100, the loading cam shaft indicated in FIG. 10c starts to rotate. After 10° of shaft rotation pusher cam 320 starts to move forward as indicated by line 370 to slice the lowest container 40 from the stack held in guide structure 150 into the transfer jaw structure 154. At point 372 vacuum is applied to the transfer head 170 and that head is moved by cam 322 as indicated by line 374 a short distance into engagement with the base 54 of the container 40. Cam 324 is then operated as indicated by line 376 to open the jaw structure 154 and release the container so that it is held solely by the vacuum on the transfer head 170 and then the head is further lowered as indicated by line 378. Travel is complete at point 380 where the container is held on the platform 100 and vacuum is turned off. Cam 326 then operates to raise the pins 110 as indicated by line 382 to cam the nine blade units 10 into their respective chambers as indicated in FIGS. 8 and 9, the blade units being fully latched in the compartments point 384. The vacuum head 170 is raised as indicated by line 386, the pins are retracted as indicated by line 388, the gripper jaws 180 are closed as indicated by energization of cylinder 274 at point 390 and the loaded container 40 is moved from the loading station 100 by retraction of the pusher and jaws as indicated by line 392. While the box is being removed the transfer jaw structure 154 is reclosed during the interval indicated by line 394. At point 396 cylinder 274 operates to open the jaws 180 and release the loaded container on the discharge chute 290.

Thus, nine blade units 10 have been assembled into two groups, positioned on loading platform 100 and inserted into a container 40 in automatic sequence.

While a particular embodiment of the invention has been shown and described, other modifications will be apparent to those skilled in the art and therefore it is not intended that the invention be limited to the disclosed embodiment or to details thereof and departures may be made therefrom within the spirit and scope of the invention as defined in the claims.

What is claimed is:

1. Apparatus for frictionally securing a plurality of articles such as razor blade units in corresponding compartments of a multi-compartment container comprising first input means for feeding razor blade units in series relation,
an assembly conveyor for receiving razor blade units sequentially from said first input means,
control means for advancing said conveyor in coordination with the feeding of blade units from said first input means to assemble a group of blade units in spaced, aligned relation on said conveyor,
a loading station having a platform and a blade unit insertion mechanism, said insertion mechanism including a plurality of insertion pins that are mounted for vertical reciprocating movement relative to said platform,
transfer mechanism for transferring said group of razor blade units from said assembly conveyor to said loading station,
second input means for transferring a container to said loading station,
and means for operating said insertion mechanism to insert the group of razor blade units at said loading station into compartments of said container, said insertion mechanism operating means including means for raising said insertion pins simultaneously to cam the blade units into their compartments with a rotary motion, each blade unit being free to slide laterally relative to the insertion pin that is driving it.

2. The apparatus as claimed in claim 1 wherein said assembly conveyor includes a series of flights connected together in an endless loop, each said flight including structure for receiving a blade unit.

3. The apparatus as claimed in claim 2 wherein each said blade unit includes coupling structure and each said conveyor flight blade unit receiving structure includes cooperating coupling structure for securing a blade unit to the flight.

4. The apparatus as claimed in claim 3 wherein each said conveyor flight coupling structure is of flanged configuration for receiving a blade unit in sliding relation from said first input means.

5. The apparatus as claimed in claim 4 wherein said transfer mechanism is arranged to slide a group of blade units from successive conveyor flight coupling structure to said loading platform.

6. The apparatus as claimed in claim 5 wherein said transfer mechanism includes two transfer members spaced apart a distance sufficient to receive a blade unit therebetween, one of said transfer members being movable relative to the other transfer member as a function of the travel of said transfer mechanism.

7. The apparatus as claimed in claim 6 wherein said one transfer member is mounted for reciprocable movement towards and away from said other transfer member, and further including biasing structure urging said transfer members apart and structure for moving said one transfer member toward said other transfer member as a function of the travel of said transfer mechanism.

8. The apparatus as claimed in claim 1 wherein said loading platform includes a series of parallel horizontal grooves for receiving blade units from said assembly conveyor, a vertical passage intersecting each said groove and an insertion pin disposed in each said vertical passage.

9. The apparatus as claimed in claim 8 wherein said control means further includes coordinated drive mechanism for feeding blade units along said first input means and operating said assembly conveyor at a first rate, means for sequentially operating said transfer mechanism to transfer two groups of blade units from said assembly conveyor to said loading station, operating said second input means to transfer a container to said loading station and then raising said insertion elements to cam said two groups of blade units into container compartments.

10. The apparatus as claimed in claim 9 and further including removal mechanism responsive to and movable with said second input means for transferring a loaded container from said loading platform.

11. The apparatus as claimed in claim 10 wherein each said razor blade unit includes a body portion and a blade portion permanently secured to said body portion, each said compartment includes a resilient latch structure and said insertion mechanism is operative to cam a group of blade units past said latch structures into frictionally secured relation in said compartments.

12. The apparatus as claimed in claim 1 wherein said transfer mechanism includes a two transfer members spaced apart a distance sufficient to receive a blade unit therebetween, one of said transfer members being movable relative to the other transfer member as a function of the travel of said transfer mechanism.

13. The apparatus as claimed in claim 12 wherein said one transfer member is mounted for reciprocable movement towards and away from said other transfer member, and further including biasing structure urging said transfer members apart and structure for moving said one transfer member toward siad other transfer member as a function of the travel of said transfer mechanism.

14. The apparatus as claimed in claim 1 wherein said control means further includes coordinated drive mechanism for feeding blade units along said first input means and operating said assembly conveyor at a first rate, means for sequentially operating said transfer mechanism to transfer a group of blade units from said assembly conveyor to said loading station, operating said second input means to transfer a container to said loading station and then operating said insertion mechanism.

15. Apparatus for frictionally securing a plurality of articles such as razor blade units in corresponding compartments of a multi-compartment container comprising
   first input means for feeding razor blade unit in series relation,
   an assembly conveyor for receiving razor blade units sequentially from said first input means,
   control means for advancing said conveyor in coordination with the feeding of blade units from said first input means to assembly a group of blade units in spaced, aligned relation on said conveyor,
   a loading station having a platform and a blade unit insertion mechanism,
   transfer mechanism for transferring said group of razor blade units from said assembly conveyor to said loading station,
   second input means for transferring a container to said loading station, said second input means including a first transfer device for transferring one container from a stack,
   intermediate support mechanism for receiving a container from said first transfer device,
   and a vacuum head operative to engage the base of a container for transferring a container from said intermediate support mechanism to said loading station and to hold said container in engagement with said loading station while the group of blade units are inserted into container by said insertion mechanism,
   said control means further including coordinated drive mechanism for feeding blade units along said first input means and operating said assembly conveyor at a first rate, means for sequentially operating said transfer mechanism to transfer a group of blade units from said assembly conveyor to said loading station, operating said second input means to transfer a container to said loading station and then operating said insertion mechanism to insert the group of razor blade units at said loading station into compartments of said container.

16. The apparatus as claimed in claim 15 wherein said loading platform includes a series of parallel horizontal grooves for receiving blade units from said assembly conveyor, a vertical passage intersecting each said groove and an insertion pin disposed in each said vertical passage.

17. In apparatus for frictionally securing a plurality of articles such as razor blade units in corresponding compartments of a multi-compartment container, said compartments being arranged in two parallel rows that are separated by a partition wall, comprising
   first input means for feeding razor blade units in series relation,
   an assembly mechanism for receiving razor blade units sequentially from said first input means and assembling said blade units in spaced, aligned relation in a group,
   a loading station having a platform and a blade unit insertion mechanism,
   second input means for transferring a container to said loading station, and means for operating said insertion mechanism to insert the group of razor blade units at said loading station into compartments of said container, a transfer mechanism for transferring groups of razor blade units from said assembly mechanism to said loading station, said transfer mechanism including two transfer members spaced apart a distance sufficient to receive a blade unit therebetween, means to move said transfer mechanism a first increment to transfer a first group of blade units from said assembly mechanism to said loading station and to move said transfer mechanism a second further increment to shift the position of said first group of blade units at said loading station and to simultaneously transfer a second group of blade units from said assembly mechanism to said loading station, one of said transfer members being moved relative to the other transfer member as a function of the travel of said transfer mechanism during said second further increment to properly position said first and second groups of blade units at said loading station in aligned position relative to the two parallel rows of compartments in said container.

18. The apparatus as claimed in claim 17 wherein said one transfer member is mounted for reciprocable movement towards and away from said other transfer member, and further including biasing structure urging said transfer members apart and structure for moving said one transfer member toward said other transfer member as a function of the travel of said transfer mechanism.

19. In apparatus for frictionally securing a plurality of articles such as razor blade units in corresponding compartments of a multi-compartment container comprising first input means for feeding razor blade units in series relation, an assembly mechanism for receiving razor blade units sequentially from said first input means and assembling said blade units in spaced, aligned relation in a group, a loading station having a platform, transfer mechanism for transferring said group of razor blade units from said assembly conveyor to said loading station, said second input means for transferring a container to said loading station, a blade unit insertion mechanism at said loading station, said insertion mechanism including a plurality of insertion pins that are mounted for vertical reciprocating movement and means for raising said insertion pins simultaneously to cam the blade units into their compartments with a rotary motion, each blade unit being free to slide laterally relative to the insertion pin that is driving it.

20. The apparatus as claimed in claim 19 wherein said loading platform includes a series of parallel horizontal grooves for receiving blade units from said assembly conveyor, a vertical passage intersecting each said groove and an insertion pin disposed in each said vertical passage.

* * * * *

UNITED STATES PATENT AND TRADEMARK OFFICE
CERTIFICATE OF CORRECTION

PATENT NO. : 3,864,897
DATED : February 11, 1975
INVENTOR(S) : William F. Hitchcock It is certified that error appears in the above—identified patent and that said Letters Patent are hereby corrected as shown below:

Column 5, line 8, delete "the".
    Column 7, line 8, change "fully" to --full--;
            line 41, change "the" (first occurrence) to --that--.
    Column 9, line 48, delete "a".
    Column 10, line 33, after "into", insert --said--.

Signed and Sealed this ninth Day of September 1975

[SEAL]

Attest:

RUTH C. MASON
*Attesting Officer*

C. MARSHALL DANN
*Commissioner of Patents and Trademarks*